(12) United States Patent
Hattori

(10) Patent No.: US 9,473,650 B2
(45) Date of Patent: Oct. 18, 2016

(54) IMAGE READING APPARATUS, IMAGE READING METHOD, IMAGE PROCESSING SYSTEM, AND STORAGE MEDIUM

(71) Applicant: CANON KABUSHIKI KAISHA, Tokyo (JP)

(72) Inventor: Yusuke Hattori, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/751,001

(22) Filed: Jun. 25, 2015

(65) Prior Publication Data

US 2016/0006891 A1 Jan. 7, 2016

(30) Foreign Application Priority Data

Jul. 4, 2014 (JP) ................................ 2014-139165

(51) Int. Cl.
| | |
|---|---|
| *G06F 3/12* | (2006.01) |
| *H04N 1/00* | (2006.01) |
| *H04N 1/409* | (2006.01) |
| *H04N 1/387* | (2006.01) |
| *H04N 1/32* | (2006.01) |

(52) U.S. Cl.
CPC ...... *H04N 1/00244* (2013.01); *H04N 1/00307* (2013.01); *H04N 1/00931* (2013.01); *H04N 1/00954* (2013.01); *H04N 1/00973* (2013.01); *H04N 1/32545* (2013.01); *H04N 1/3877* (2013.01); *H04N 1/4092* (2013.01); *H04N 1/4095* (2013.01)

(58) Field of Classification Search
None
See application file for complete search history.

(56) References Cited

U.S. PATENT DOCUMENTS

| | | | |
|---|---|---|---|
| 2009/0225349 A1* | 9/2009 | Hirai | H04N 1/00204 358/1.15 |
| 2014/0043659 A1* | 2/2014 | Kawakami | G06K 9/344 358/470 |

FOREIGN PATENT DOCUMENTS

| | | |
|---|---|---|
| JP | 2004-289500 | 10/2004 |
| JP | 2011-248527 | 12/2011 |
| JP | 2012-238980 | 12/2012 |

* cited by examiner

*Primary Examiner* — Dov Popovici
(74) *Attorney, Agent, or Firm* — Fitzpatrick, Cella, Harper and Scinto

(57) ABSTRACT

According to an embodiment of this invention, in a system including an image reading apparatus and a server, the image reading apparatus and the server can efficiently cooperatively perform image processing with a simple arrangement. More specifically, the image reading apparatus reads an image of an original, upon receiving an image reading instruction from a user terminal via the server, according to the instruction. The apparatus analyzes whether image processing included in the instruction is executable. If executable image processing exists, the apparatus executes the image processing for image data obtained by reading the image of the original. The image data of the original or image data that has undergone the image processing is transmitted to a transmission destination together with information representing whether the image processing included in the instruction has been executed.

21 Claims, 18 Drawing Sheets

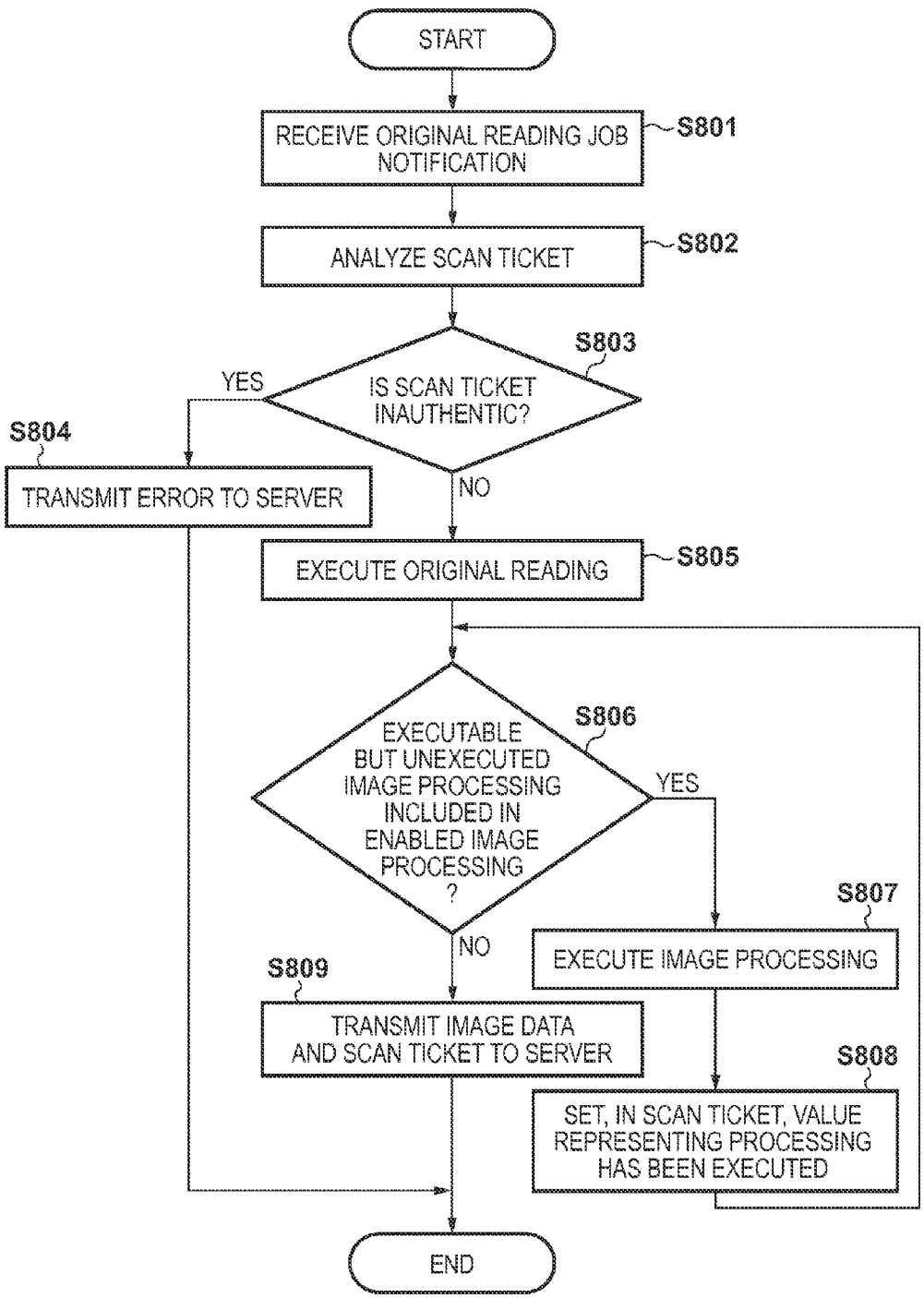

902 {
| ScanParameter | |
|---|---|
| DocumentType | Photo |
| Size | A4 |
| Resolution | 300 |

903 {
| ModelInformation | |
|---|---|
| ModelName | AAAA |
| SensorType | CIS |

904 {
| ImageProcess | |
|---|---|
| Format | PDF,UNPROCESSED |
| Rotation | 90,UNPROCESSED |
| UnsharpMask | On,PROCESSED |
| RemoveBaseColor | On,UNPROCESSED |

1402 {
| ScanParameter | |
|---|---|
| DocumentType | Photo |
| Size | A4 |
| Resolution | 300 |

1403 {
| ModelInformation | |
|---|---|
| ModelName | AAAA |
| SensorType | CIS |

1404 {
| ImageProcess | |
|---|---|
| Format | PDF,UNPROCESSED |
| Rotation | 90,UNPROCESSED |
| UnsharpMask | On,PROCESSED |
| RemoveBaseColor | On,PROCESSED |

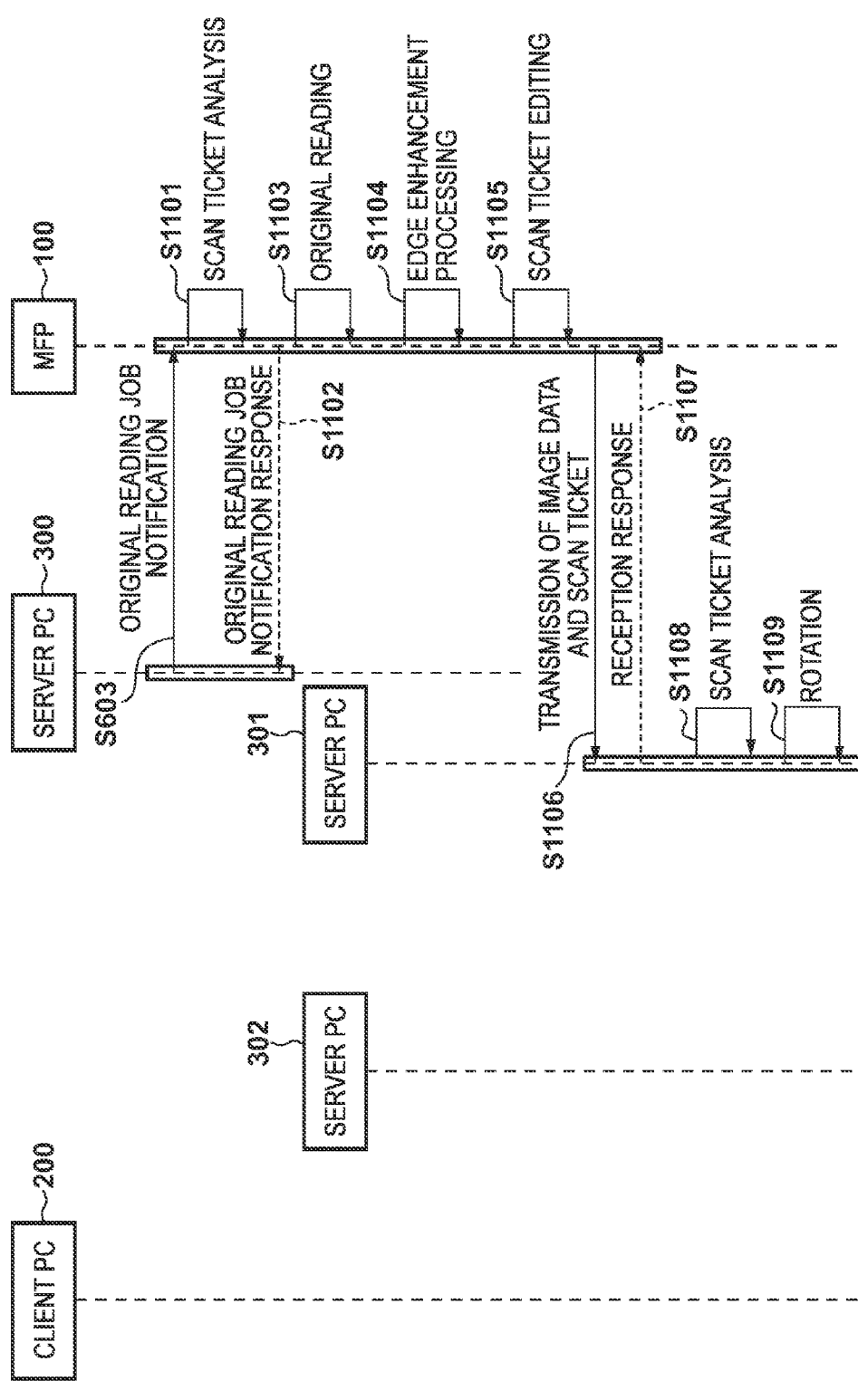

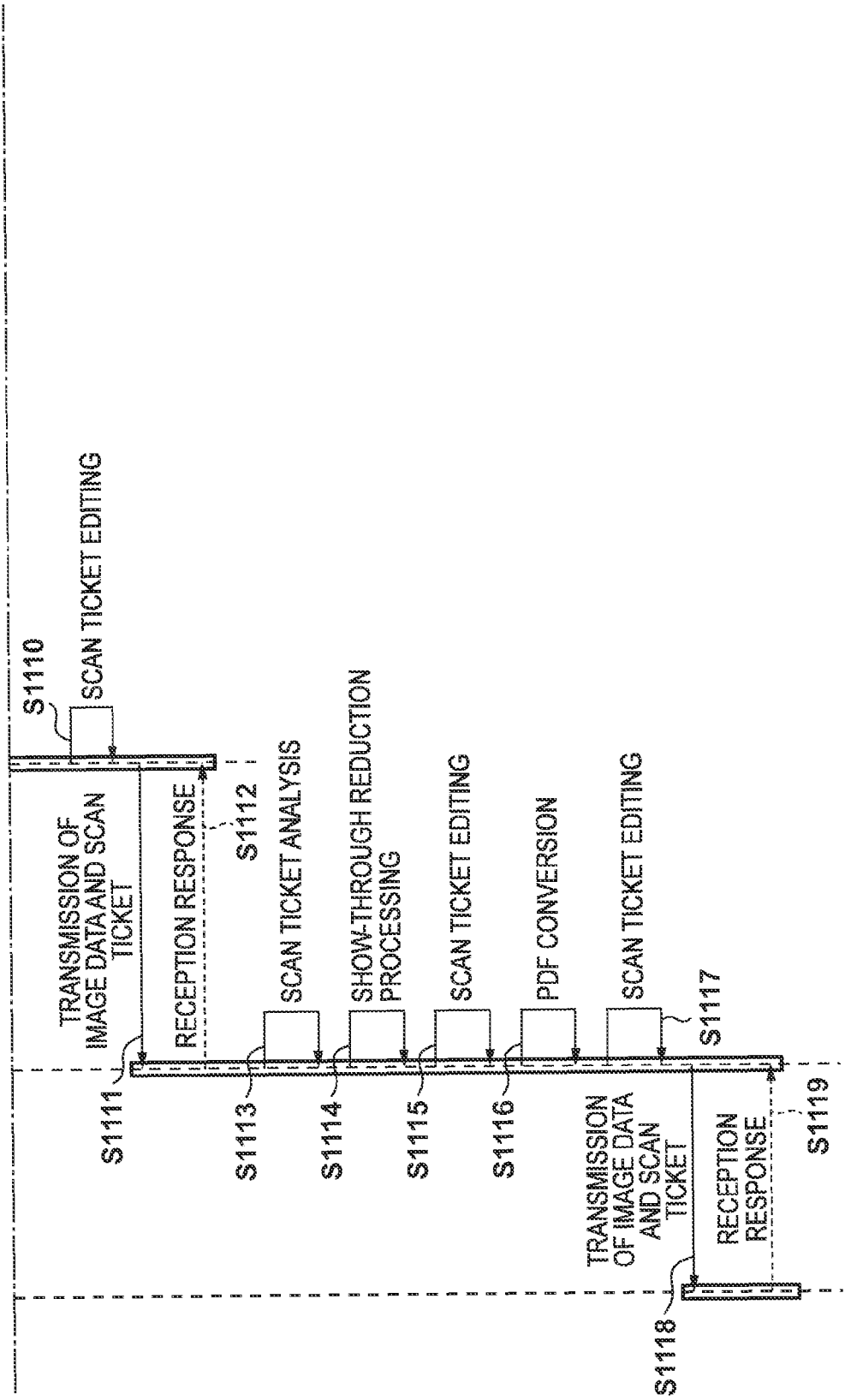

| ScanParameter | |
|---|---|
| DocumentType | Photo |
| Size | A4 |
| Resolution | 300 |
| ModelInformation | |
| ModelName | AAAA |
| SensorType | CIS |
| ImageProcess | |
| Format | PDF,UNPROCESSED |
| Rotation | 90,PROCESSED |
| UnsharpMask | On,PROCESSED |
| RemoveBaseColor | On,UNPROCESSED |

- 1202: ScanParameter group (DocumentType, Size, Resolution)
- 1203: ModelInformation group (ModelName, SensorType)
- 1204: ImageProcess group (Format, Rotation, UnsharpMask, RemoveBaseColor)

| ScanParameter | |
|---|---|
| DocumentType | Photo |
| Size | A4 |
| Resolution | 300 |
| ModelInformation | |
| ModelName | AAAA |
| SensorType | CIS |
| ImageProcess | |
| Format | PDF,PROCESSED |
| Rotation | 90,PROCESSED |
| UnsharpMask | On,PROCESSED |
| RemoveBaseColor | On,PROCESSED |

- 1302: ScanParameter group
- 1303: ModelInformation group
- 1304: ImageProcess group

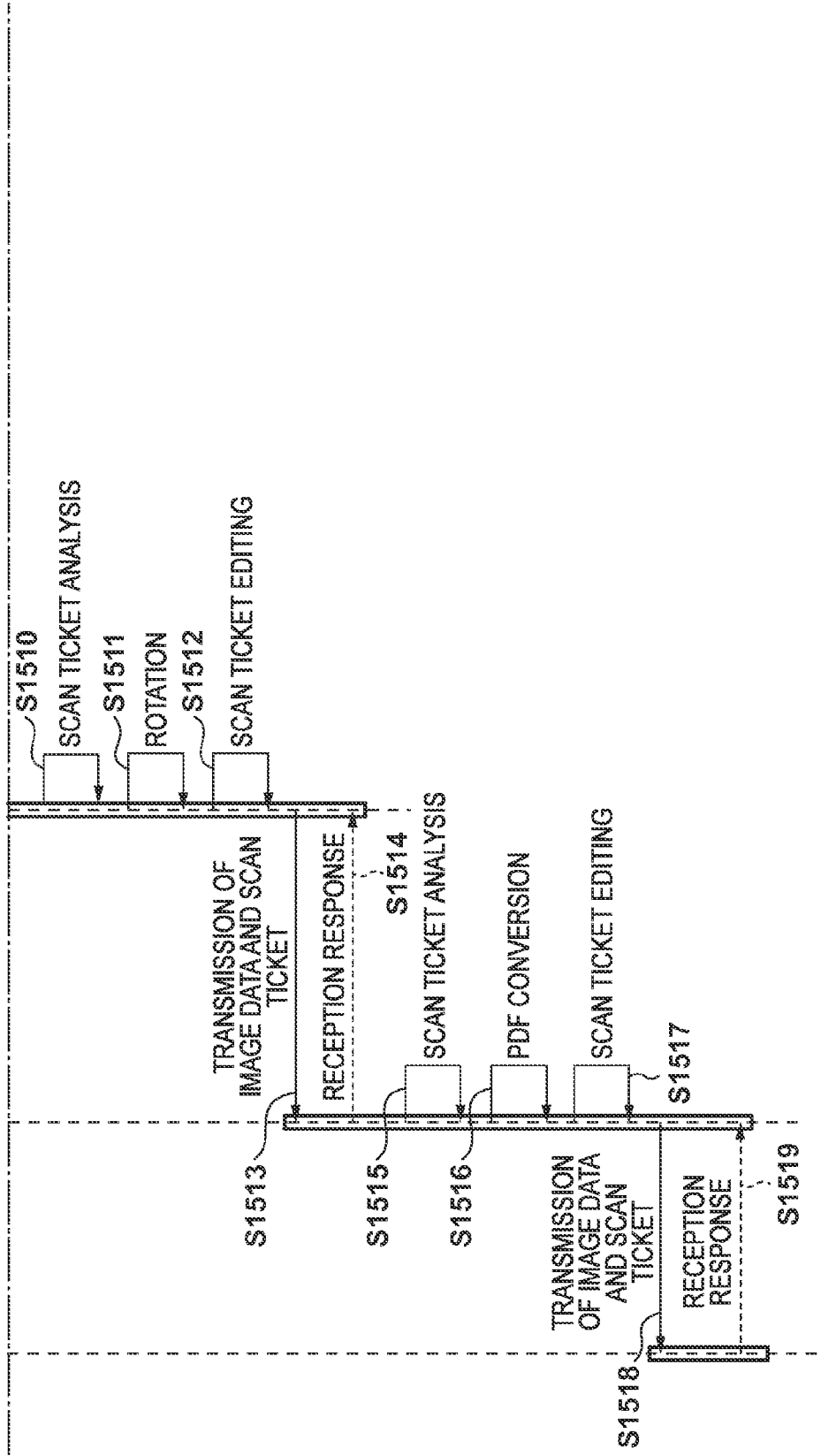

| ScanParameter | |
|---|---|
| DocumentType | Photo |
| Size | A4 |
| Resolution | 300 |
| ModelInformation | |
| ModelName | AAAA |
| SensorType | CIS |
| ImageProcess | |
| Format | PDF,UNPROCESSED |
| Rotation | 90,UNPROCESSED |
| UnsharpMask | On,PROCESSED |
| RemoveBaseColor | On,PROCESSED |

- 1602: ScanParameter group (DocumentType, Size, Resolution)
- 1603: ModelInformation group (ModelName, SensorType)
- 1604: ImageProcess group (Format, Rotation, UnsharpMask, RemoveBaseColor)

| ScanParameter | |
|---|---|
| DocumentType | Photo |
| Size | A4 |
| Resolution | 300 |
| ModelInformation | |
| ModelName | AAAA |
| SensorType | CIS |
| ImageProcess | |
| Format | PDF,UNPROCESSED |
| Rotation | 90,PROCESSED |
| UnsharpMask | On,PROCESSED |
| RemoveBaseColor | On,PROCESSED |

- 1702: ScanParameter group
- 1703: ModelInformation group
- 1704: ImageProcess group

IMAGE READING APPARATUS, IMAGE READING METHOD, IMAGE PROCESSING SYSTEM, AND STORAGE MEDIUM

BACKGROUND OF THE INVENTION

1. Field of the Invention

The present invention relates to an image reading apparatus, an image reading method, an image processing system, and a storage medium, and particularly to an image reading apparatus connected via a network such as the Internet, an image reading method, an image processing system, and a storage medium.

2. Description of the Related Art

In recent years, a system in which a printing apparatus or scanner apparatus is connected to an information processing apparatus using various interfaces such as USB, Ethernet®, and wireless LAN is effectively used in various scenes such as a home and office. Examples of apparatuses included in the system are a PC, a smartphone, a portable telephone, a TV, a printer, a multifunction peripheral, a facsimile apparatus, a scanner, a digital camera, and a combination thereof.

At present, various services are provided using the Internet. The services include a web service that causes a server connected via a network to control a printing apparatus or scanner apparatus and provides the functions/services of the scanner apparatus or printing apparatus to a user via the network.

Such a web service uses a system in which image data generated by a scanner apparatus is processed not only in the apparatus main body but also by a connected server (for example, Japanese Patent Laid-Open No. 2004-289500). In addition, there is a system that automatically decides which server should perform what kind of image processing in the system (for example, Japanese Patent Laid-Open No. 2012-238980). There also exists a system that, in an environment where a scanner apparatus and a server have the same image processing function, causes the server to perform image processing if the load on the server side is not more than a threshold, or performs image processing on the scanner apparatus side otherwise (for example, Japanese Patent Laid-Open No. 2011-248527).

However, scanner apparatuses or printing apparatuses connected to a server are not of the same model, and these apparatuses have various image processing functions. In addition, the image processing functions are prepared on the server side in some cases but not in others.

The techniques disclosed in Japanese Patent Laid-Open Nos. 2004-289500 and 2012-238980 are used only for control of image processing on the server but do not assume the above-described situation. Even if an intended image processing function is prepared on the printing apparatus or scanner apparatus, it is unusable on the server side.

In the technique disclosed in Japanese Patent Laid-Open No. 2011-248527, in a case where the load of the server is light, image processing is always performed on the server side. For this reason, image processing functions prepared on the printing apparatus or scanner apparatus are not used.

SUMMARY OF THE INVENTION

Accordingly, the present invention is conceived as a response to the above-described disadvantages of the conventional art.

For example, an image reading apparatus, an image reading method, an image processing system, and a storage medium according to this invention are capable of, in a system in which a variety of apparatuses having different image processing functions are connected via a network, causing a plurality of apparatuses to efficiently cooperatively perform image processing by a simple arrangement while making full use of the functions of each apparatus.

According to one aspect of the present invention, there is provided an image reading apparatus for reading an image of an original, comprising: a reading unit configured to read the image of the original according to an image reading instruction from a user; an image processing unit configured to perform image processing for image data obtained by reading the image of the original by the reading unit in a case where there exists the image processing that is specified in the image reading instruction and is executable by the image reading apparatus; and a transmission unit configured to transmit information representing whether the image processing specified in the image reading instruction has been executed and one of the image data obtained by reading the image of the original by the reading unit and image data that has undergone the image processing by the image processing unit.

The invention is particularly advantageous since an image reading apparatus is specified by an image reading instruction, and the image reading apparatus can execute executable image processing and transmit information representing that the image processing has already been executed to a transmission destination together with image data that has undergone the image processing. The image reading apparatus thus executes image processing executable by itself and performs the transmission, thereby executing intended image processing for the read image data.

Further features of the present invention will become apparent from the following description of exemplary embodiments (with reference to the attached drawings).

BRIEF DESCRIPTION OF THE DRAWINGS

FIG. 8 is a flowchart showing original reading processing and image processing executed by two MFPs upon receiving an original reading job notification from the server PC.

FIG. 9 is a view showing an example of a scan ticket transmitted from an MFP 100 to the server PC in step S809.

FIG. 10 is a view showing an example of a scan ticket transmitted from an MFP 150 to the server PC in step S809.

FIGS. 12A and 12B are sequence charts showing a processing sequence after the MFP 100 has received an original reading job notification from the server PC until the client PC receives image data.

FIG. 13 is a view showing a scan ticket edited and created in step S1110.

FIG. 14 is a view showing a scan ticket edited and created in step S1117.

FIGS. 15A and 15B are sequence charts showing a sequence after the MFP 150 has received an original reading job notification from the server PC until the client PC receives image data.

FIG. 16 is a view showing a scan ticket edited and created in step S1507.

FIG. 17 is a view showing a scan ticket edited and created in step S1512.

DESCRIPTION OF THE EMBODIMENTS

Exemplary embodiments of the present invention will now be described in detail in accordance with the accompanying drawings. It should be noted that the relative arrangement of the constituent elements, and the like set forth in these embodiments do not limit the scope of the present invention unless it is specifically stated otherwise.

In this specification, the terms "print" and "printing" not only include the formation of significant information such as characters and graphics, but also broadly includes the formation of images, figures, patterns, and the like on a print medium, or the processing of the medium, regardless of whether they are significant or insignificant and whether they are so visualized as to be visually perceivable by humans.

Also, the term "print medium" not only includes a paper sheet used in common printing apparatuses, but also broadly includes materials, such as cloth, a plastic film, a metal plate, glass, ceramics, wood, and leather, capable of accepting ink.

<Arrangement of Network System (FIGS. 1 to 3)>

Figure 1:
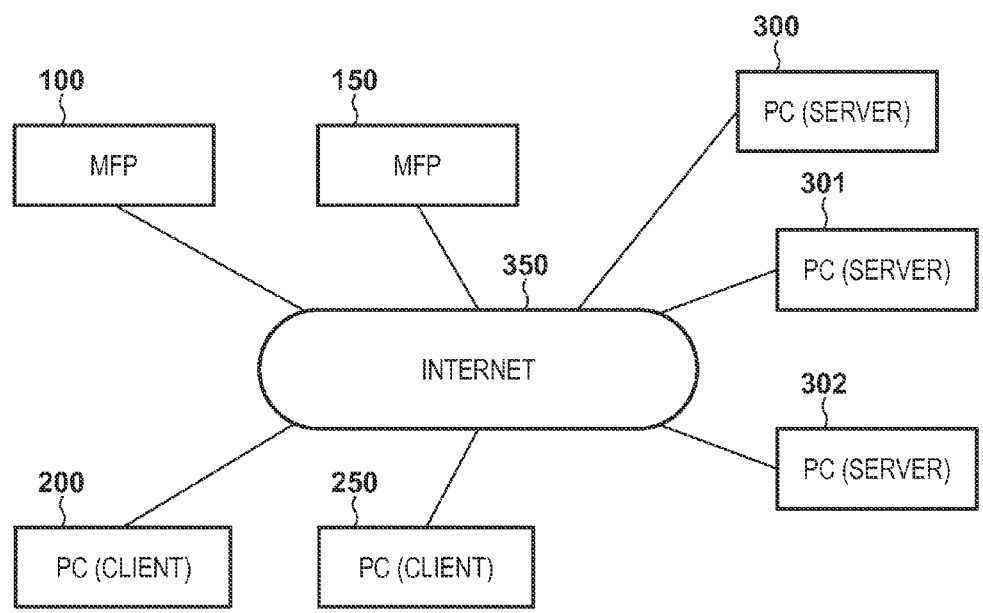
FIG. 1 is a block diagram showing the schematic arrangement of a network system according to an embodiment of the present invention, which includes multifunction printers (MFPs) and personal computers (PCs) connected to each other via a network.

FIG. 1 is a block diagram showing the schematic arrangement of a client-server type network system (to be referred to as a system hereinafter) according to an embodiment of the present invention. As shown in FIG. 1, this system is configured such that a plurality of multifunction printers (to be referred to as MFPs hereinafter) 100 and 150 and a plurality of personal computers (to be referred to as PCs hereinafter) 200, 250, and 300 to 302 are connected to each other via the Internet 350.

Note that the configuration for connecting the MFPs and the PCs need not always be the Internet and may be an intranet or a network using a dedicated protocol. The physical interface for connecting the MFPs and the PCs can have a wireless LAN/WAN configuration, a wired LAN/WAN configuration, or a configuration including both wired and wireless networks.

The plurality of PCs (information processing apparatuses) have the same arrangement. Out of the above-described plurality of PCs, some PCs (PCs 200 and 250) operate as client PCs, and the remaining PCs (PCs 300 to 302) operate as servers. A client operating system (to be referred to as an OS hereinafter) is installed in each client PC and operates. On the other hand, a server OS is installed in each server PC and operates. Here, the above-described PCs are assumed to have the same arrangement for the sake of simplicity. However, the PCs may have different arrangements in terms of hardware arrangement and software configuration as long as they can be connected to another PC or an MFP via the network. For example, the client PC and the server PC have different arrangements. The client PC includes apparatuses like a laptop PC, a tablet terminal, a smartphone, and a PDA (Personal Digital Assistant). On the other hand, the server PC includes a high-performance desktop PC with a large-capacity memory or disk. In this case, the client PC is sometimes simply called a user terminal.

A description will be made assuming that the plurality of MFPs 100 and 150 have the same functions for the sake of simplicity. However, the MFPs may have different arrangements in terms of hardware arrangement and software configuration as long as they can be connected to a PC or another MFP via the network.

The numbers of client PCs, server PCs, and MFPs connected to the Internet 350 are not limited to those shown in FIG. 1, and the number of apparatuses of each type may be less than 2 or 3 or more.

Figure 2:
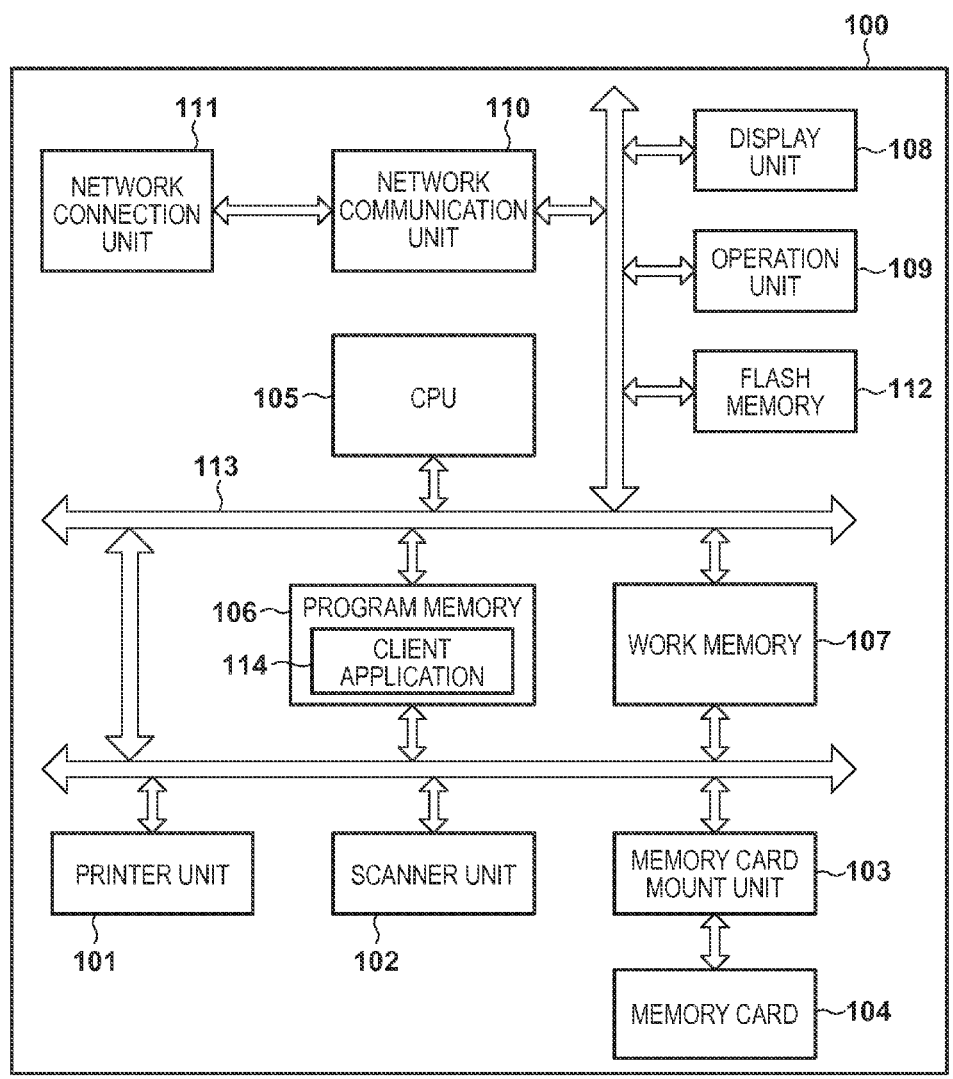
FIG. 2 is a block diagram showing the schematic arrangement of an MFP shown in FIG. 1.

FIG. 2 is a block diagram showing the schematic arrangement of the MFP 100 shown in FIG. 1.

The MFP 100 has a printer function, a scanner function, and a storage function, and can provide each functional service via the network. In the MFP 100, the printer function is implemented by a printer unit 101, the scanner function is implemented by a scanner unit 102, and the storage function is implemented by a memory card mount unit 103 and a memory card 104.

The printer unit 101 prints an image on a print medium such as print paper based on print data received from the outside or image data stored in the memory card 104 in accordance with an inkjet method, an electrophotographic method, or the like.

The scanner unit 102 optically reads an original placed on an original table, converts the data into image data, further converts the data into a specified file format, and transmits the data to an external apparatus via the network, or transfers the image data to the printer unit 101 to duplicate the read image (copy service). The scanner unit 102 can also save the data obtained by converting the read data into image data and further converting the image data into the specified file format in the saving area (not shown) of the internal storage of the MFP.

In response to a request from an external apparatus (for example, PC) connected via the network, the memory card mount unit 103 can read out a file stored in the memory card 104, transfer the file to the external apparatus so that the external apparatus can edit it, and store the edited file in the memory card from the external apparatus.

The MFP 100 also includes a CPU 105 configured to control the units of the MFP, and a program memory 106 such as a ROM storing program codes and the like to be read by the CPU 105. The MFP 100 further includes a work memory 107 such as a RAM configured to temporarily store or buffer image data or the like upon executing each service, a display unit 108 such as an LCD, and an operation unit 109 formed from switches (to be described later).

The MFP 100 also includes a network communication unit 110 configured to connect the MFP 100 to the network and perform various kinds of communications, and a network connection unit 111 configured to connect the network communication unit 110 to the network medium. The network communication unit 110 supports at least one of a wired LAN and a wireless LAN. The network connection unit 111 supporting the wired LAN is a connector configured to connect the LAN cable to the MFP 100. The network connection unit 111 supporting the wireless LAN is an antenna.

The MFP 100 also includes a non-volatile flash memory 112 configured to store data received by the network communication unit 110.

The above-described constituent elements of the MFP 100 are connected to each other by a signal bus 113.

A client application 114 that causes the MFP 100 to operate as a client to communicate with the above-described server PCs 300 to 302 is provided in the program memory 106 of the MFP 100. The CPU 105 can communicate with the server PCs 300 to 302 by executing the client application 114.

Figure 3:
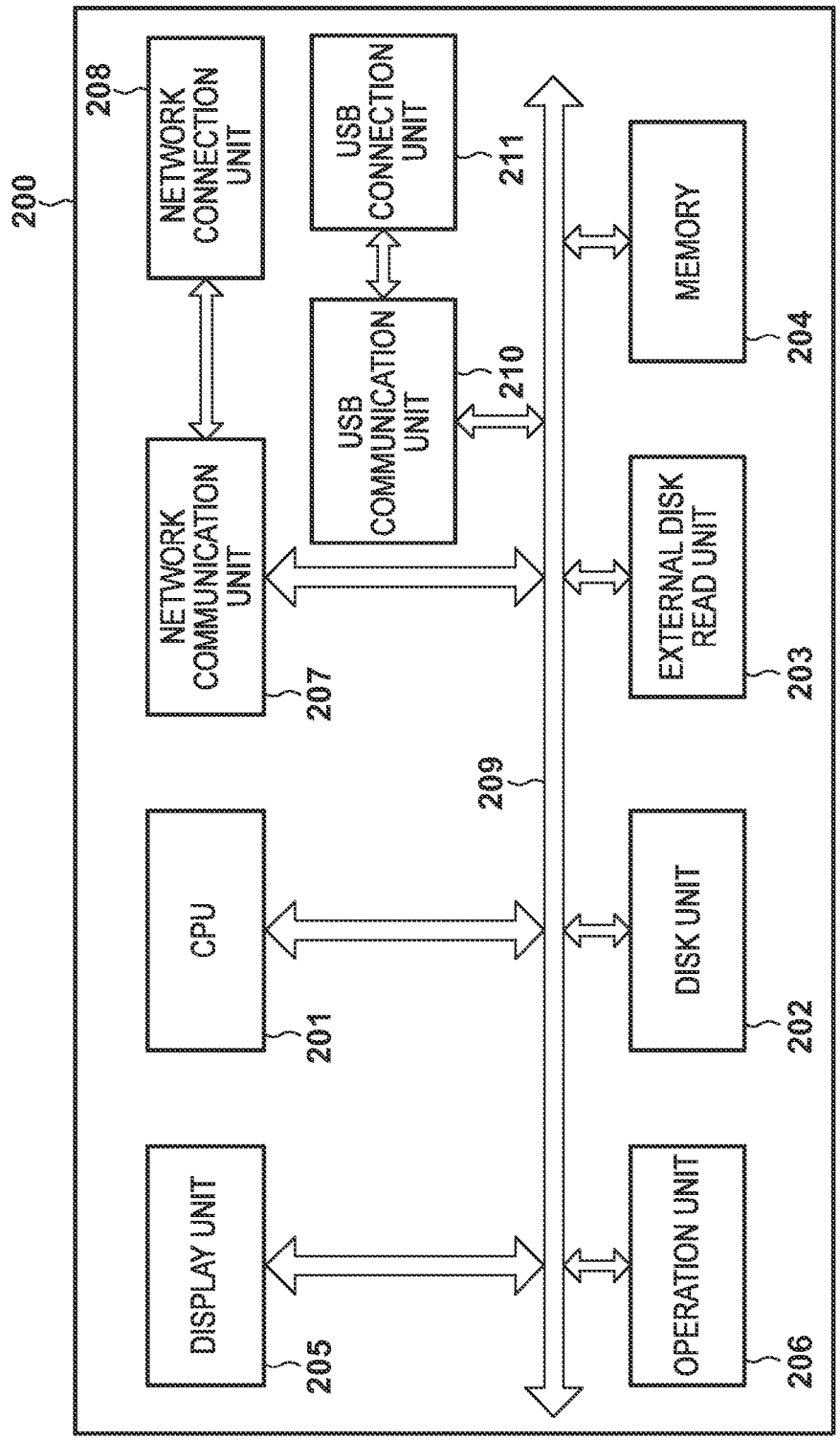
FIG. 3 is a block diagram showing the schematic arrangement of a PC shown in FIG. 1.

FIG. 3 is a block diagram showing the schematic arrangement of the PC 200 shown in FIG. 1. In this system, the PC can be operated as a client PC or server PC, as described above.

As shown in FIG. 3, a CPU 201 reads out and executes the OS or an application program installed in a disk unit 202 and controls the units of the PC 200. The disk unit 202 stores various kinds of files and the like. An external disk read unit 203 is used to read out the contents of an external storage medium such as a CD-ROM or a DVD. A memory 204 is used by the CPU 201 to temporarily store or buffer data as needed. The PC 200 further includes a display unit 205 formed from an LCD or LED, and an operation unit 206 including a keyboard and a pointing device.

For communication via the network, the PC 200 also includes a network communication unit 207 configured to connect the PC 200 to the network and perform various kinds of communications, and a network connection unit 208 that connects the network communication unit 207 to the network medium. As in the MFP 100, the network communication unit 207 and the network connection unit 208 support at least one of a wired LAN and a wireless LAN. As for a specific configuration, they take necessary functions and configurations in accordance with the supported LAN, like the network communication unit 110 and the network connection unit 111 integrated in the MFP 100.

The PC 200 further includes a USB communication unit 210 configured to communicate with another apparatus via a USB interface, and a USB connection unit 211 such as a USB connector.

The above-described constituent elements are connected to each other by a signal line bus 209.

Remote image reading and image processing implemented in the network system having the above-described arrangement will be described next. In this case, the network system functions as an image processing system.

Processing of sending an original reading instruction from the client PC 200 to the MFP 100 via the Internet 350 and acquiring a read image will be described here. The MFP 100 is assumed to have edge enhancement processing as an image processing function. On the other hand, the MFP 150 is assumed to have edge enhancement processing and show-through reduction processing as image processing functions and be able to execute rotation processing depending on the free memory space. The free memory space increases in accordance with memory addition to the MFP 150 or decreases depending on other job processing states. The memory amount necessary for rotation processing is decided by the rotation angle. Note that the image processing functions are not limited to the above examples, and other image processing functions such as original region cutout processing, OCR processing, and PDF conversion processing may be provided. At any rate, in the above example, the image processing functions of the MFP 100 and those of the MFP 150 are different.

As for the image processing functions on the server side, the server PC 301 is assumed to be able to perform rotation processing, and the server PC 302 is assumed to be able to perform show-through reduction and PDF conversion. However, the image processing functions are not limited to the above examples, and other image processing functions such as edge enhancement processing, original region cutout processing, and OCR processing may be provided. At any rate, in the above example, the image processing functions of the server PC 301 and those of the server PC 302 are different.

In addition, the server PC 300 may have some of the image processing functions.

Figure 4:
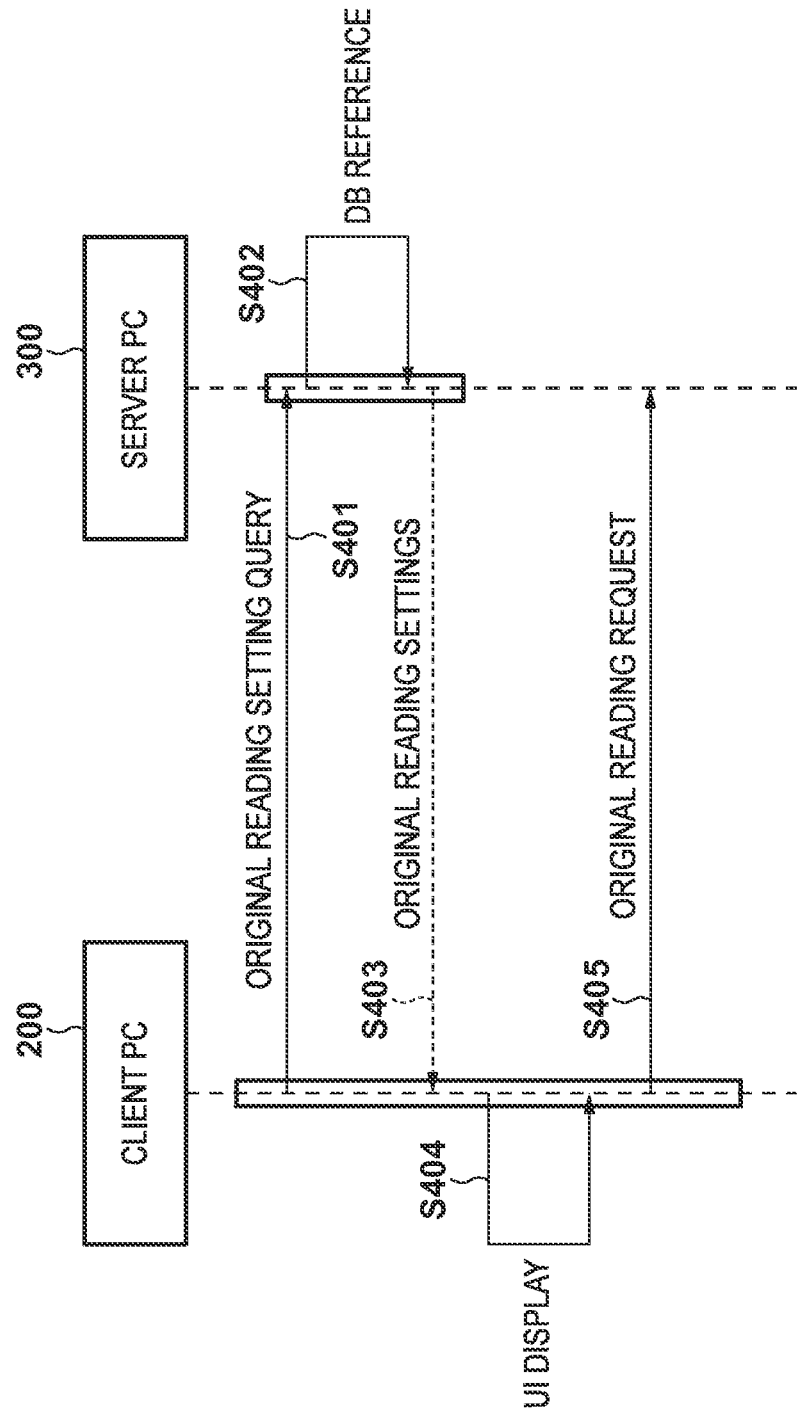
FIG. 4 is a sequence chart showing a sequence of causing a client PC to communicate with a server PC via the Internet and send an original reading request.

FIG. 4 is a sequence chart showing a sequence of causing the client PC 200 to communicate with the server PC 300 via the Internet 350 and send an original reading request.

First, the client PC 200 transmits an original reading setting query to the server PC 300 (step S401). After receiving the original reading setting query from the client PC 200, the server PC 300 refers to a database (DB) storing a list of original reading settings in advance (step S402), and returns original reading settings to the client PC 200 (step S403).

The list of original reading settings is the list of settings provided by the web service and need not be managed on a model basis.

After receiving the original reading settings from the server PC 300, the client PC 200 performs display on a UI (User Interface) in accordance with the settings (step S404).

Figure 5:
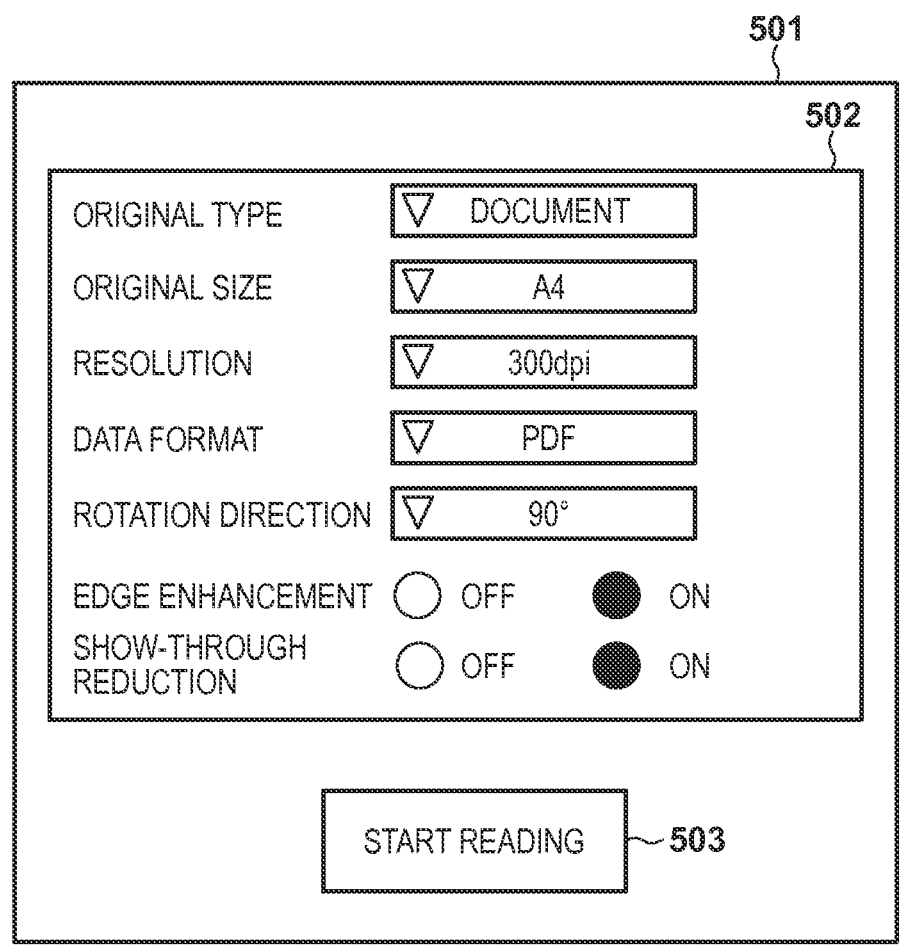
FIG. 5 is a view showing an example of UI display.

FIG. 5 is a view showing an example of UI display. The user operates a various setting display portion 502 for original reading displayed on a UI screen 501 shown in FIG. 5 and thus makes desired settings. After that, when the user presses a reading start button 503, a set original reading request is transmitted to the server PC 300 (step S405).

Figure 6:
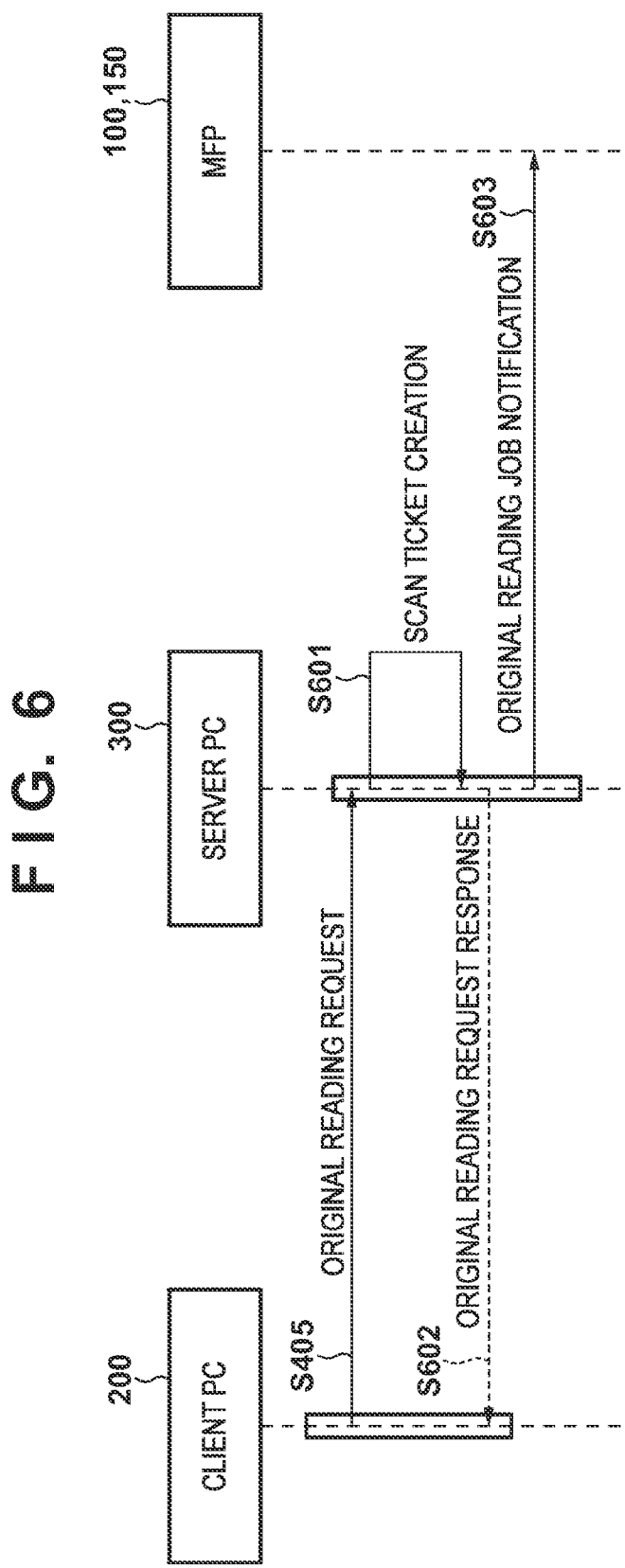
FIG. 6 is a sequence chart showing a processing sequence of causing the server PC to receive an original reading request from the client PC and notify two MFPs of an original reading job.

FIG. 6 is a sequence chart showing a processing sequence of causing the server PC 300 to receive the original reading request from the client PC 200 and notify the MFP 100 or MFP 150 of an original reading job.

Upon receiving the original reading request from the client PC 200 (step S405), the server PC 300 creates a scan ticket in accordance with the received original reading settings (step S601).

Figure 7:
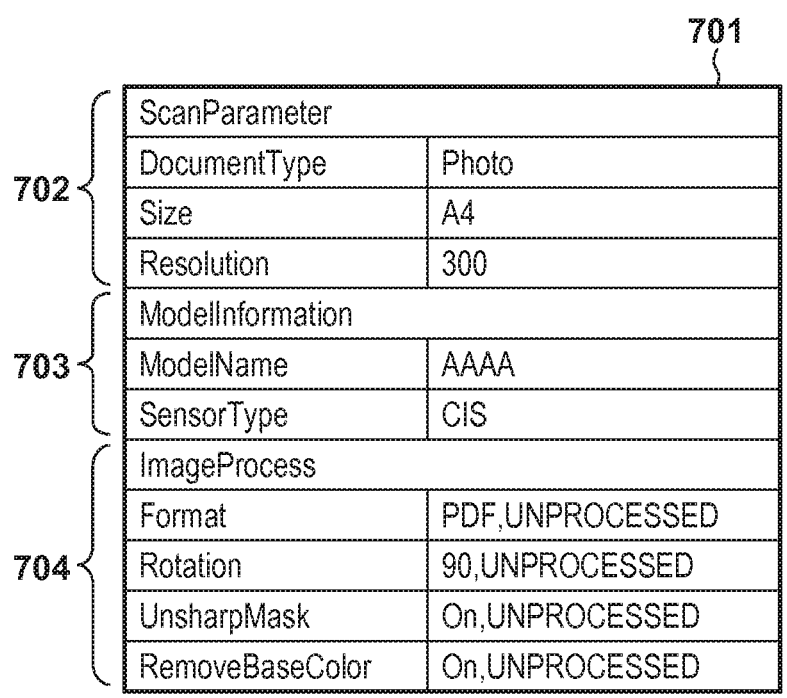
FIG. 7 is a view showing a scan ticket created in step S601.

FIG. 7 is a view showing a scan ticket created in step S601. As shown in FIG. 7, a scan ticket 701 includes a reading setting portion 702 in which values specified by the user on the UI screen 501 are set, a model information portion 703, and an image processing setting portion 704. Although not displayed on the UI screen 501, the model information portion 703 includes model information that is held in the database (DB) of the server PC 300 and is necessary for original reading. In the image processing setting portion 704, values specified by the user on the UI screen 501 are set.

The image processing setting portion 704 shown in FIG. 7 includes information used to specify image processing set by the user as image processing to be executed. In this example, PDF conversion (Format: PDF), 90° rotation processing (Rotation: 90), edge enhancement processing (UnsharpMask), and show-through reduction processing (RemoveBaseColor) are enabled (On). A value representing that each image processing is unexecuted (UNPROCESSED) is also set. That is, these image processes are specified as image processing to be executed.

After the scan ticket is correctly created, the server PC 300 transmits an original reading request response to the client PC 200 (step S602). The server PC 300 also notifies the MFP 100 or 150 that is the MFP specified by the user of the scan ticket created in step S601 as an original reading job (step S603).

FIG. 8 is a flowchart showing original reading processing and image processing executed by the MFP 100/MFP 150 upon receiving an original reading job notification from the server PC 300. Note that a program corresponding to the processing of the flowchart shown in FIG. 8 is stored in the program memory 106, and the CPU 105 executes the program on the work memory 107, thereby implementing the processing shown in FIG. 8.

The MFP 100/MFP 150 receives an original reading job notification from the server PC 300 (step S801). The MFP analyzes the received scan ticket (step S802). Upon determining as the result of analysis that the scan ticket is not authentic, the MFP transmits an error to the server PC 300 (step S804). Then, the processing ends.

On the other hand, upon determining that the scan ticket is authentic, the MFP executes original reading in accordance with the original reading settings described in the scan ticket, thereby generating image data (step S805). The MFP also analyzes the received scan ticket and checks whether image processing executable by the MFP 100/MFP 150 exists among the enabled but unexecuted image processes (step S806). Upon determining that executable but unexecuted image processing exists, the MFP executes the unexecuted image processing for the image data (step S807), and describes, in the scan ticket, information representing that the image processing has been executed (step S808). For example, the MFP 100 is of a model capable of executing edge enhancement processing. Hence, if edge enhancement processing is enabled in the scan ticket, the MFP 100 executes it. The MFP 150 is of a model capable of executing edge enhancement processing and show-through reduction processing. Hence, if edge enhancement processing and show-through reduction processing are enabled in the scan ticket, the MFP 150 executes them.

On the other hand, upon determining that image processing executable by the MFP 100/MFP 150 does not exist among the enabled but unexecuted image processes, the MFP transmits the image data and the scan ticket to the server PC 301 (step S809). The transmission destination may be managed by the MFP 100/150. Alternatively, the transmission destination may be described in the scan ticket, and transmission may be done based on it. Otherwise, the server PC 300 that has transmitted the scan ticket may be queried about the transmission destination.

According to the processing shown in FIG. 8 described above, it is possible to appropriately execute image processing that is executable by the MFP 100/150 for executing the processing shown in FIG. 8 and is enabled but still unexecuted. For image processing executed by the MFP 100/150 itself, information representing that the image processing has been executed is described in the scan ticket. This allows an apparatus (for example, server) that has received the scan ticket to recognize that the image processing has been executed. It is therefore possible to prevent the image processing from being doubly executed even if it is executable by the apparatus. Details of processing of the server will be described with reference to FIG. 11.

FIG. 9 is a view showing an example of a scan ticket transmitted from the MFP 100 to the server PC 301 in step S809. As shown in FIG. 9, a scan ticket 901 includes a reading setting portion 902 that is the same as the above-described reading setting portion 702, a model information portion 903 that is the same as the model information portion 703, and an image processing setting portion 904.

In the image processing setting portion 904, a value representing that image processing has been executed (PROCESSED) is set in the portion of edge enhancement processing (UnsharpMask) executed by the MFP 100 based on the image processing setting portion 704. In the image processing setting portion 904, both a value representing image processing is enabled (On) and the value representing that image processing has been executed (PROCESSED) are described. However, only the value representing that image processing has been executed may be described, or the item of the executed processing may wholly be deleted.

On the other hand, FIG. 10 is a view showing an example of a scan ticket transmitted from the MFP 150 to the server PC 301 in step S809. As shown in FIG. 10, a scan ticket 1401 includes a reading setting portion 1402 that is the same as the above-described reading setting portion 702, a model information portion 1403 that is the same as the model information portion 703, and an image processing setting portion 1404.

In the image processing setting portion 1404, a value representing that image processing has been executed (PROCESSED) is set in each of the portions of edge enhancement processing (UnsharpMask) and the show-through reduction processing (RemoveBaseColor) executed by the MFP 150 based on the image processing setting portion 704. In the image processing setting portion 1404, both a value representing image processing is enabled (On) and the value representing that image processing has been executed (PROCESSED) are described. However, only the value representing that image processing has been executed may be described, or the items of the executed processes may wholly be deleted.

Figure 11:
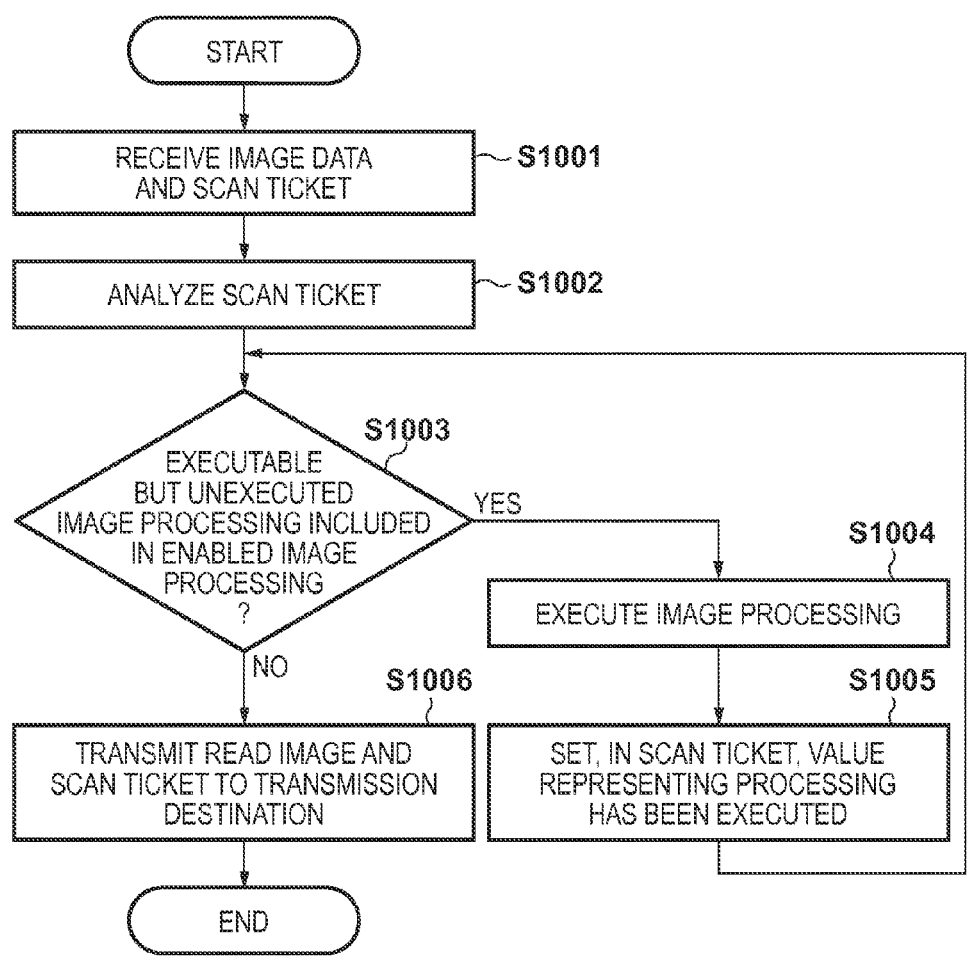
FIG. 11 is a flowchart showing processing executed by two other server PCs.

FIG. 11 is a flowchart showing processing executed by the server PCs 301 and 302.

The server PC 301 receives image data and a scan ticket from the MFP 100/MFP 150, and the server PC 302 receives them from the server PC 301 (step S1001). The server PC analyzes the received scan ticket (step S1002). More specifically, the server PC analyzes image processing (image processing to be executed) enabled in the scan ticket and information described in the scan ticket in step S808 of FIG. 8 by the MFP 100/150. The server PC 302 can thus identify image processing that should be executed for the read image but is still unexecuted by the MFP 100/150.

The server PC checks, as the result of analysis, whether image processing executable by the server PC itself exists among the enabled but unexecuted image processes (step S1003). Note that in step S1003, it is determined whether the image processing identified by the analysis in step S1002 is executable by the server PC 301. Upon determining that executable image processing exists, the server PC executes the image processing for the image data (step S1004), and describes, in the scan ticket, information representing that the image processing has been executed (step S1005).

On the other hand, upon determining that image processing executable by the server PC itself does not exist among the enabled but unexecuted image processes, the server PC transmits the image data and the scan ticket to the next transmission destination (step S1006). The next transmission destination may be managed by each of the server PCs 301 and 302. Alternatively, the transmission destination may be described in the scan ticket, and transmission may be done based on it. Otherwise, the server PC 300 that has created the scan ticket may be queried about the transmission destination.

FIGS. 12A and 12B are sequence charts showing an example of a processing sequence after the MFP 100 has received an original reading job notification from the server PC 300 until the client PC 200 receives image data.

The MFP 100 receives an original reading job notification from the server PC 300 (step S603). The scan ticket received at this time is the above-described scan ticket 701. The MFP 100 analyzes the scan ticket 701 (step S1101). If analysis of the scan ticket 701 has succeeded, the MFP 100 transmits an original reading job notification response to the server PC 300 (step S1102).

The MFP 100 performs original reading in accordance with the reading settings described in the scan ticket 701, thereby generating image data (step S1103). In the scan ticket 701, edge enhancement processing is enabled but unexecuted, as described above. The MFP 100 can execute edge enhancement processing and therefore performs edge enhancement processing for the generated image data (step S1104). The MFP 100 describes, in the scan ticket 701, information representing that edge enhancement processing has been executed (step S1105). Remaining image processes enabled in the scan ticket 701 are inexecutable by the MFP 100. For this reason, the MFP 100 does not change the items of the remaining image processes in the scan ticket 701. The scan ticket after the description is the above-described scan ticket 901.

The MFP 100 transmits the scan ticket 901 and the image data that has undergone the edge enhancement processing to the server PC 301 (step S1106). The server PC 301 is the server as the transmission destination of the scan ticket 901, which receives the data from the MFP 100.

The server PC 301 receives the scan ticket 901 and the image data that has undergone the edge enhancement processing from the MFP 100, and transmits a reception response to the MFP 100 (step S1107). The server PC 301 analyzes the received scan ticket 901 (step S1108). In the scan ticket 901, rotation processing is enabled but unexecuted. The server PC 301 can execute rotation processing and therefore performs rotation processing (step S1109). Remaining image processes enabled in the scan ticket 901 are inexecutable by the server PC 301. For this reason, the server PC 301 does not change the items of the remaining image processes in the scan ticket 901. The server PC 301 describes, in the scan ticket 901, information representing that rotation processing has been executed (step S1110).

FIG. 13 is a view showing a scan ticket created in step S1110. As shown in FIG. 13, a scan ticket 1201 is created by the server PC 301 and includes a reading setting portion 1202 that is the same as the reading setting portion 902, a model information portion 1203 that is the same as the model information portion 903, and an image processing setting portion 1204. In the image processing setting portion 1204, a value representing that image processing has been executed (PROCESSED) is set in the portion of rotation processing (Rotation) executed by the server PC 301 based on the image processing setting portion 904.

Referring back to FIG. 12B, the server PC 301 transmits the scan ticket 1201 and the image data that has undergone the edge enhancement processing and the rotation processing to the server PC 302 (step S1111). The server PC 302 is the server that performs image processing next to the server PC 301.

Upon receiving the scan ticket 1201 and the image data that has undergone the edge enhancement processing and the rotation processing from the server PC 301, the server PC 302 transmits a reception response to the server PC 301 (step S1112). The server PC 302 analyzes the received scan ticket 1201 (step S1113). In the received scan ticket 1201, show-through reduction processing is enabled but unexecuted. The server PC 302 can execute show-through reduction processing and therefore performs show-through reduction processing (step S1114).

After that, the server PC 302 describes, in the scan ticket, information representing that show-through reduction processing has been executed (step S1115). Additionally, in the received scan ticket 1201, PDF conversion processing is enabled but unexecuted. The server PC 302 can execute PDF conversion and therefore further executes PDF conversion processing (step S1116). The server PC 302 further describes, in the scan ticket edited in step S1115, information representing that PDF conversion has been executed (step S1117).

FIG. 14 is a view showing a scan ticket edited and created in step S1117. As shown in FIG. 14, a scan ticket 1301 includes a reading setting portion 1302 that is the same as the reading setting portion 1202, a model information portion 1303 that is the same as the model information portion 1203, and an image processing setting portion 1304. In the image processing setting portion 1304, a value representing that image processing has been executed (PROCESSED) is set in each of the portions of show-through reduction and PDF conversion executed by the server PC 302 based on the image processing setting portion 1204.

Referring back to FIG. 12B, if there is no unexecuted image processing anymore, the server PC 302 transmits the scan ticket 1301 and the image data that has undergone the edge enhancement processing, the rotation processing, the show-through reduction processing, and the PDF conversion processing to the client PC 200 that has issued the original reading request (step S405) (step S1118). Upon receiving the image data and the scan ticket 1301, the client PC 200 transmits a reception response to the server PC 302 (step S1119).

An example in which an original is read by the MFP 150 will be described next as another example of the sequence according to this embodiment. Note that the MFP 150 can execute show-through reduction processing, unlike the MFP 100.

Figure 15A:
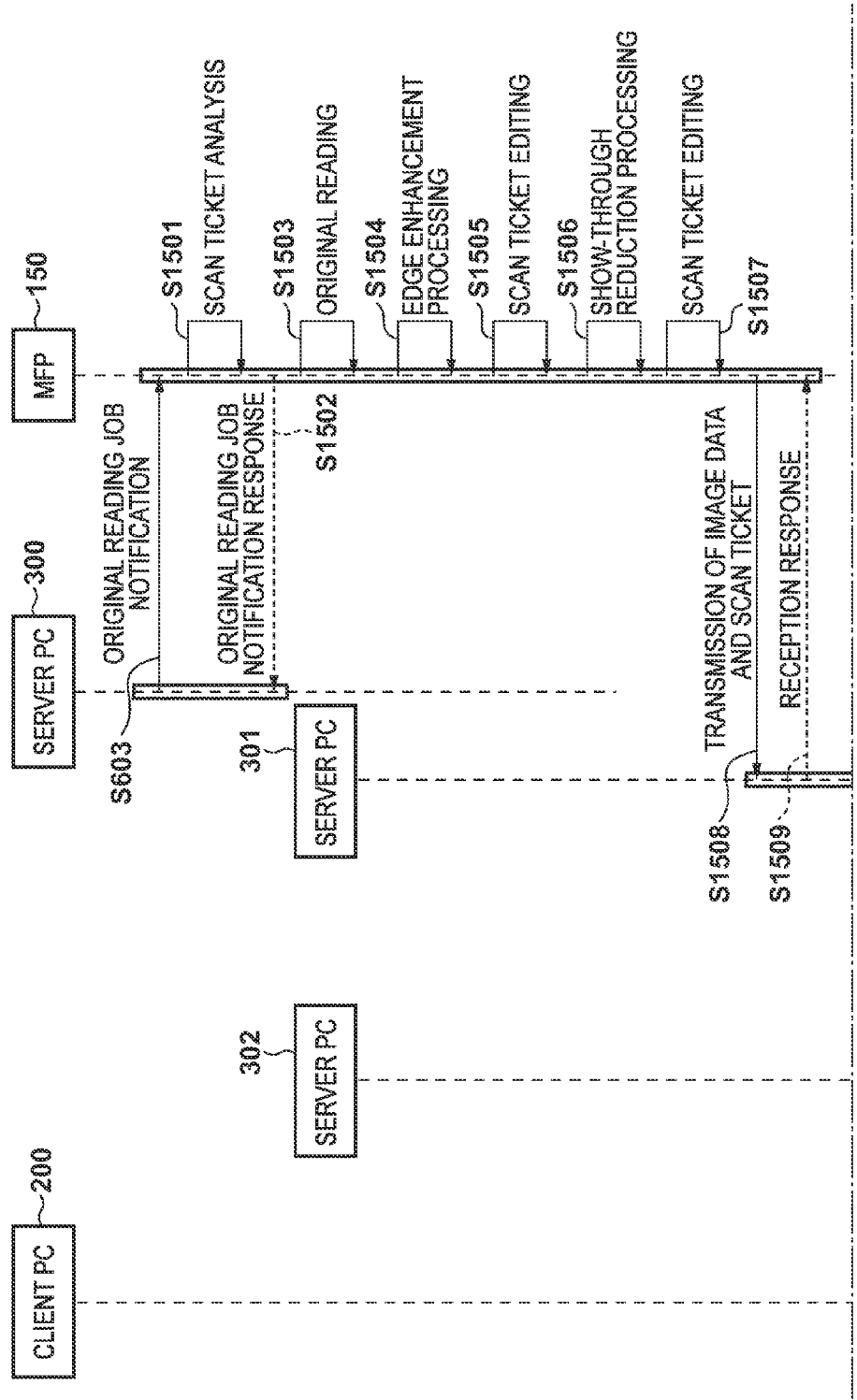

FIGS. 15A and 15B are sequence charts showing a sequence after the MFP 150 has received an original reading job notification from the server PC 300 until the client PC 200 receives image data.

In the processing sequence showing in FIGS. 15A and 15B, the MFP 150 is assumed to have no free memory space necessary for rotation processing and be unable to perform rotation processing.

The MFP 150 receives an original reading job notification from the server PC 300 (step S603). The scan ticket received at this time is the above-described scan ticket 701. The MFP 150 analyzes the scan ticket 701 (step S1501). If analysis of the scan ticket 701 has succeeded, the MFP 150 transmits an original reading job notification response to the server PC 300 (step S1502).

The MFP 150 executes original reading in accordance with the reading settings described in the scan ticket 701, thereby generating image data (step S1503). The scan ticket 701 represents that edge enhancement processing is enabled but unexecuted. The MFP 150 can execute edge enhancement processing and therefore performs edge enhancement processing for the generated image data (step S1504). The MFP 150 describes, in the scan ticket 701, information representing that edge enhancement processing has been executed (step S1505). The scan ticket 701 also represents that show-through reduction processing is enabled but unexecuted. The MFP 150 can execute show-through reduction processing and therefore executes show-through reduction processing for the image data that has undergone edge enhancement processing (step S1506). The MFP 150 describes, in the scan ticket edited in step S1505, information representing that show-through reduction processing has been executed (step S1507).

FIG. 16 is a view showing a scan ticket edited and created in step S1507. As shown in FIG. 16, a scan ticket 1601 includes a reading setting portion 1602 that is the same as the reading setting portion 702, a model information portion 1603 that is the same as the model information portion 703, and an image processing setting portion 1604. In the image processing setting portion 1604, a value representing that image processing has been executed (PROCESSED) is set in each of the portions of edge enhancement processing and show-through reduction executed by the MFP 150 based on the image processing setting portion 704.

Referring back to FIGS. 15A and 15B, the MFP 150 transmits the scan ticket 1601 and the image data that has undergone the edge enhancement processing and the show-through reduction processing to the server PC 301 (step S1508). The server PC 301 is the server that receives image data from the MFP 150, that is, the server as the transmission destination of the scan ticket 1601.

Upon receiving the scan ticket 1601 and the image data that has undergone the edge enhancement processing and the show-through reduction processing from the MFP 150, the server PC 301 transmits a reception response to the MFP 150 (step S1509). The server PC 301 analyzes the received scan ticket 1601 (step S1510). In the scan ticket 1601, rotation processing is enabled but unexecuted. The server PC 301 can execute rotation processing and therefore executes rotation processing (step S1511). After that, the server PC 301 describes, in the scan ticket 1601, information representing that rotation processing has been executed (step S1512).

FIG. 17 is a view showing a scan ticket edited and created in step S1512. As shown in FIG. 17, a scan ticket 1701 includes a reading setting portion 1702 that is the same as the reading setting portion 1602, a model information portion 1703 that is the same as the model information portion 1603, and an image processing setting portion 1704. In the image processing setting portion 1704, a value representing that image processing has been executed (PROCESSED) is set in the portion of rotation processing executed by the server PC 301 based on the image processing setting portion 1604.

Referring back to FIG. 15B, the server PC 301 transmits the scan ticket 1701 and the image data that has undergone the edge enhancement processing, the show-through reduction processing, and the rotation processing to the server PC 302 (step S1513). The server PC 302 is the server that performs image processing next to the server PC 301.

Upon receiving the scan ticket 1701 and the image data that has undergone the edge enhancement processing, the show-through reduction processing, and the rotation processing from the server PC 301, the server PC 302 transmits a reception response to the server PC 301 (step S1514). The server PC 302 analyzes the received scan ticket 1701 (step S1515). The received scan ticket 1701 represents that PDF conversion processing is enabled but unexecuted. The server PC 302 can execute PDF conversion and therefore executes PDF conversion processing (step S1516). After that, the server PC 302 describes, in the scan ticket 1701, information representing that PDF conversion has been executed (step S1517). The scan ticket after the description is the above-described scan ticket 1301.

If there is no unexecuted image processing anymore, the server PC 302 transmits the scan ticket 1301 and the image data that has undergone the edge enhancement processing, the rotation processing, the show-through reduction processing, and the PDF conversion processing to the client PC 200 that has issued the original reading request (step S405) (step S1518). After receiving the image data and the scan ticket 1301, the client PC 200 transmits a reception response to the server PC 302 (step S1519).

Figure 18A:
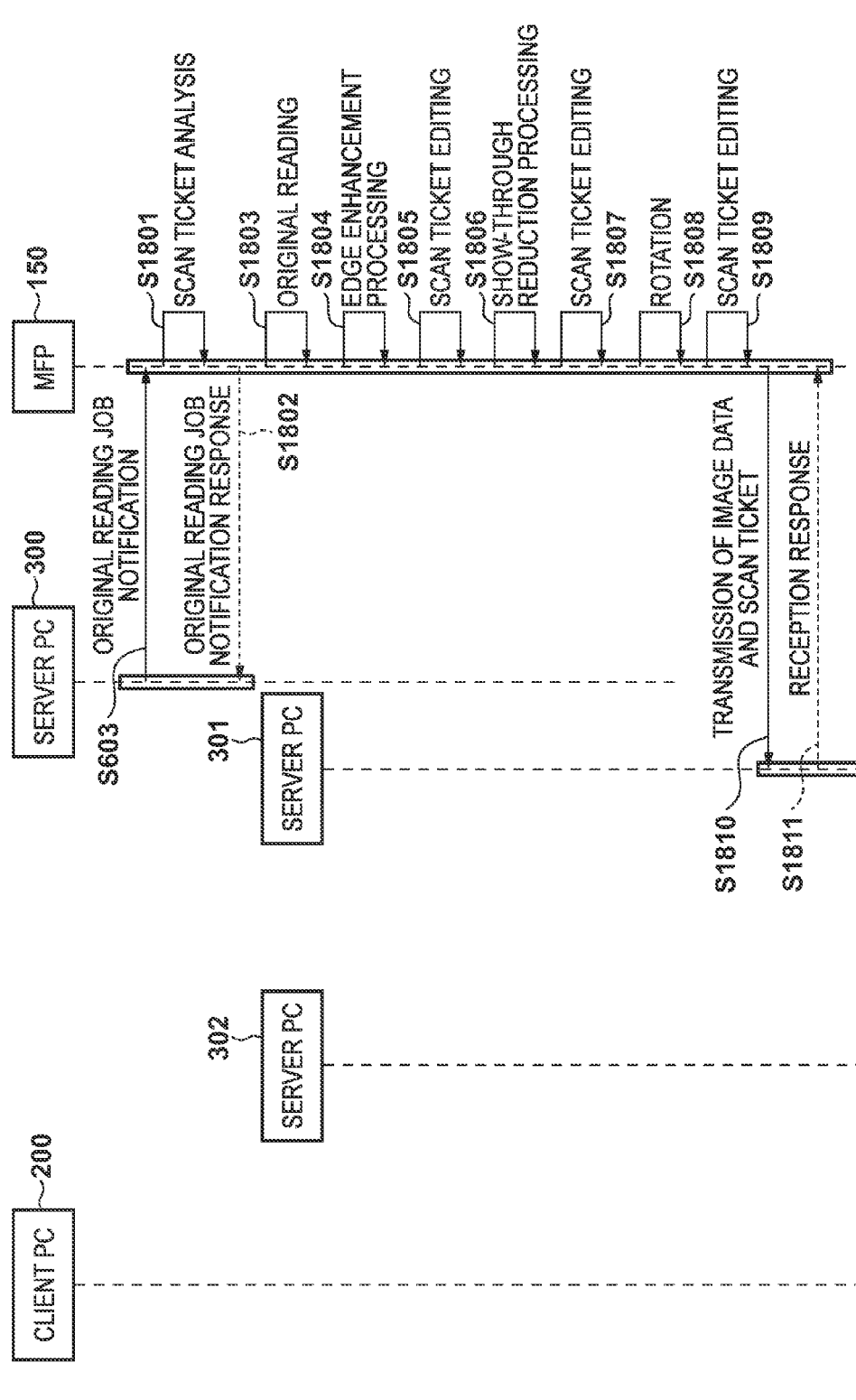
FIGS. 18A and 18B are sequence charts showing a processing sequence after the MFP 150 has received an original reading job notification from the server PC until the client PC receives image data.
Figure 18B:
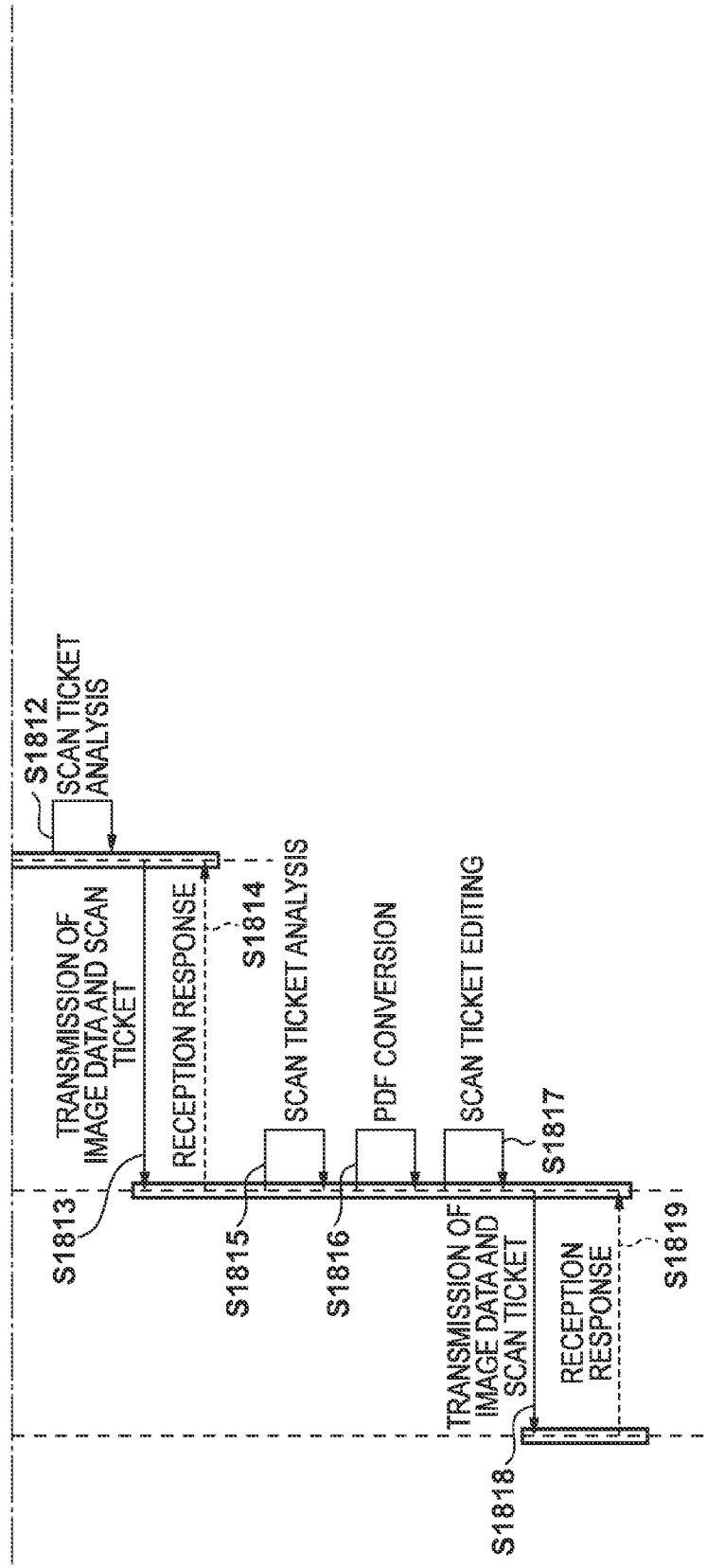

FIGS. 18A and 18B are sequence charts showing a sequence after the MFP 150 has received an original reading job notification from the server PC 300 until the client PC 200 receives image data.

Note that in the processing sequence showing in FIGS. 18A and 18B, the MFP 150 is assumed to have a free memory space necessary for rotation processing and be able to perform rotation processing.

The MFP 150 receives an original reading job notification from the server PC 300 (step S603). The scan ticket received at this time is the above-described scan ticket 701. The MFP 150 analyzes the scan ticket 701 (step S1801). If analysis of the scan ticket 701 has succeeded, the MFP 150 transmits an original reading job notification response to the server PC 300 (step S1802).

The MFP 150 executes original reading in accordance with the reading settings described in the scan ticket 701, thereby generating image data (step S1803). The scan ticket 701 represents that edge enhancement processing is enabled but unexecuted. The MFP 150 can execute edge enhancement processing and therefore performs edge enhancement processing for the generated image data (step S1804). The MFP 150 describes, in the scan ticket 701, information representing that edge enhancement processing has been executed (step S1805). In the scan ticket 701, show-through reduction processing is also enabled but unexecuted. The MFP 150 can execute show-through reduction processing and therefore executes show-through reduction processing for the image data that has undergone edge enhancement processing (step S1806). The MFP 150 describes, in the scan ticket edited in step S1805, information representing that show-through reduction processing has been executed (step S1807). In the scan ticket 701, rotation processing is also enabled but unexecuted. The MFP 150 can execute rotation processing and therefore executes rotation processing for the image data that has undergone edge enhancement processing and the show-through reduction processing (step S1808). The MFP 150 describes, in the scan ticket edited in step S1807, information representing that rotation processing has been executed (step S1809). The scan ticket after the description is the above-described scan ticket 1701.

The MFP 150 transmits the scan ticket 1701 and the image data that has undergone the edge enhancement processing, the show-through reduction processing, and the rotation processing to the server PC 301 (step S1810). The server PC 301 is the server that receives image data from the MFP 150 or the server as the transmission destination of the scan ticket 1701.

Upon receiving the scan ticket 1701 and the image data that has undergone the edge enhancement processing, the show-through reduction processing, and the rotation processing from the MFP 150, the server PC 301 transmits a reception response to the MFP 150 (step S1811).

The server PC 301 analyzes the received scan ticket 1701 (step S1812). Since executable image processing does not exist among the enabled but unexecuted image processes in the scan ticket 1701, the server PC 301 transfers the scan ticket 1701 and the image data that has undergone the edge enhancement processing, the show-through reduction processing, and the rotation processing to the server PC 302

(step S1813). The server PC 302 is the server that performs image processing next to the server PC 301 or the server as the transmission destination of the scan ticket 1701.

Upon receiving the scan ticket 1701 and the image data that has undergone the edge enhancement processing, the show-through reduction processing, and the rotation processing from the server PC 301, the server PC 302 transmits a reception response to the server PC 301 (step S1814). The server PC 302 analyzes the received scan ticket 1701 (step S1815). The received scan ticket 1701 represents that PDF conversion processing is enabled but unexecuted. The server PC 302 can execute PDF conversion and therefore executes PDF conversion processing (step S1816). The server PC 302 describes, in the scan ticket 1701, information representing that PDF conversion has been executed (step S1817). The scan ticket after the description is the above-described scan ticket 1301.

If there is no unexecuted image processing anymore, the server PC 302 transmits the scan ticket 1301 and the image data that has undergone the edge enhancement processing, the rotation processing, the show-through reduction processing, and the PDF conversion processing to the client PC 200 that has issued the original reading request (step S405) (step S1818).

Upon receiving the image data and the scan ticket 1301, the client PC 200 transmits a reception response to the server PC 302 (step S1819).

Hence, according to the above-described embodiment, image processing executable by the MFP is executed by the MFP itself. The MFP describes, in a scan ticket, information representing that the image processing has been executed, and notifies the server of it. The server is allowed to execute only unexecuted image processing described in the scan ticket. Since this can make full use of the functions of the MFP and simultaneously minimize the processing load of the server, the operation cost of the server can be reduced.

Additionally, even if MFPs and servers having different functions coexist, the functions and executed processes can be managed by transmitting/receiving the scan ticket. Since the management need not be done by the server, it is possible to flexibly cope with a network system of any configuration. For example, even if the firmware of the MFP is updated, and an image processing function installed in it is deleted or a new image processing function is added, it is possible to cope with the system without changing the server. If there is an MFP that has no image processing function at all, the server receives image data generated by reading an original from the MFP and executes all image processes.

Note that in the above embodiment, an example has been described in which in a case where an apparatus that has received a scan ticket executes image processing for a read image, information representing that the image processing has been executed is described in the scan ticket. However, information representing that the image processing is enabled (used to instruct to perform the image processing) may be deleted from the scan ticket, as described above. This can also prevent the image processing from being doubly executed by the apparatus that has received the scan ticket with the information deleted.

However, in a case where information representing that image processing has been executed is described in the scan ticket, following processing can be performed. For example, assume a case where the MFP performs color conversion processing for a read image, and the server performs additional color conversion processing. At this time, in the configuration that deletes information representing that image processing is enabled, as described above, information about "color conversion" is deleted by the MFP. Then, the server cannot determine whether to execute color conversion processing.

By describing, in the scan ticket, information representing that the image processing has been executed, the server can recognize that the color conversion has been executed by the MFP. In this case, since the server also executes color conversion processing, color conversion processing can further be executed for the image that has undergone color conversion processing in the MFP.

Note that in the above-described embodiment, the user inputs a reading instruction or specifies image processing to be performed for a read image on the client PC 200. However, the present invention is not limited to this. For example, the screen shown in FIG. 5 may be displayed on the display unit 108 of the MFP 100, and the user may operate the operation unit 109 to execute the reading instruction or image processing specifying.

In this case, for example, the MFP 100 may be provided with a web browser function, and the screen shown in FIG. 5 may be provided by the server PC 300. When the user inputs the reading instruction or specifies image processing on the screen, the pieces of information may be notified from the MFP 100 to the server PC 300. The server PC 300 may generate a scan ticket, as in the above-described embodiment, and issue the scan ticket to the MFP. In a case where the user performs an operation on the MFP 100 as well, the scan ticket is generated and issued, as in the above-described embodiment. This allows the server PC 302 to generate and issue a scan ticket by common processing regardless of whether the user's reading instruction or image processing specifying is performed on the client PC 200 or the MFP 100.

In the above embodiment, an example in which the MFP performs original image reading and (if possible) image processing has been described. However, the present invention is not limited to this. For example, a flatbed type scanner apparatus (image reading apparatus) having a single function and connectable to a network may be used.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-139165, filed Jul. 4, 2014, which is hereby incorporated by reference herein in its entirety.

What is claimed is:

1. An image reading apparatus for reading an image of an original, comprising:
   at least one processor; and
   a reading unit configured to read the image of the original, wherein
   said at least one processor causes said reading unit to read the image of the original according to a scan ticket having a predetermined format and specifying image processing designated by a user,
   said at least one processor performs image processing for image data obtained by reading the image of the original by said reading unit in a case where there exists the image processing that is specified in the scan ticket and is executable by the image reading apparatus,
   said at least one processor edits contents of the scan ticket so as to include information for specifying image processing which is unexecuted out of the image processing specified in the scan ticket, and
   said at least one processor transmits the edited scan ticket and image data that has undergone the image processing.

2. The apparatus according to claim 1, wherein the image processing includes at least one of PDF conversion, rotation of the image, edge enhancement, and show-through reduction.

3. The apparatus according to claim 1, wherein a transmission destination of said at least one processor is specified in the scan ticket or determined by querying an apparatus that has transmitted the scan ticket.

4. The apparatus according to claim 1, wherein the image reading apparatus is integrated in a multifunction printer having a printer function and a storage function.

5. The apparatus according to claim 1, wherein said at least one processor edits the contents of the scan ticket so as to represent which has been executed and which is unexecuted out of the image processing.

6. The apparatus according to claim 5, wherein said at least one processor describes, in the scan ticket, information representing which has been executed by said at least one processor in a case where said at least one processor edits the contents of the scan ticket.

7. An image reading method of an image reading apparatus for reading an image of an original, comprising:
   reading the image of the original according to a scan ticket having a predetermined format and specifying image processing designated by a user;
   performing image processing for image data obtained by reading the image of the original in the reading in a case where the image processing is specified in the scan ticket and is executable by the image reading apparatus;
   editing contents of the scan ticket so as to include information for specifying image processing which is unexecuted out of the image processing specified in the scan ticket; and
   transmitting the edited scan ticket and image data that has undergone the image processing.

8. The method according to claim 7, wherein the image processing includes at least one of PDF conversion, rotation of the image, edge enhancement, and show-through reduction.

9. The method according to claim 7, wherein a transmission destination in the transmitting is specified in the scan ticket or determined by querying an apparatus that has transmitted the scan ticket.

10. The method according to claim 7, wherein the image reading apparatus is integrated in a multifunction printer having a printer function and a storage function.

11. The method according to claim 7, wherein in the editing, the contents of the scan ticket is edited so as to represent which has been executed and which is unexecuted out of the image processing.

12. The method according to claim 11, wherein in the editing, information representing which has been executed is described in the scan ticket.

13. An image processing system formed by connecting an image reading apparatus for reading an image of an original, a user terminal, and a server via a network,
   wherein said image reading apparatus comprises:
      a first processor, wherein
         said first processor causes a reading unit of said image reading apparatus to read the image of the original according to a scan ticket having a predetermined format and specifying image processing designated by a user,
         said first processor performs image processing for image data obtained by reading the image of the original in a case where there exists the image processing that is specified in the scan ticket and is executable by said image reading apparatus,
         said first processor edits contents of the scan ticket so as to include information for specifying image processing which is unexecuted out of the image processing specified in the scan ticket, and
         said first processor transmits the edited scan ticket and image data that has undergone the image processing by said first processor,
   said user terminal comprises:
      a second processor, wherein
         said second processor causes a communication unit of said user terminal to transmit an instruction for reading the image of the original and executing the image processing, to said server, and
         said second processor causes the communication unit to receive the image data that has undergone the image processing by said first processor via the network as a result of the instruction, and
   said server comprises a third processor, wherein
      said third processor notifies said image reading apparatus of the scan ticket according to the instruction received from said user terminal.

14. The system according to claim 13, wherein said third processor of said server causes a communication unit of said server to receive the image data transmitted by said image reading apparatus and the scan ticket which includes information for specifying image processing which is unexecuted out of the image processing specified in the scan ticket,
   said third processor of said server performs the image processing for the image data received by the communication unit of said server in a case where the unexecuted image processing is specified by the information included in the received scan ticket, and the unexecuted image processing is executable by said server, said third processor of said server edits the contents of the received scan ticket so as to include information for specifying image processing which is unexecuted by said third processor, and said third processor of said server transmits the edited scan ticket and the image data that has undergone the image processing by said third processor.

15. The system according to claim 14, wherein said server comprises a plurality of servers, and said plurality of servers can execute different image processes, and one of the plurality of servers transmits the edited scan ticket and the image data that has undergone the image processing, to another one of the plurality of servers.

16. The system according to claim 15, wherein another server of said plurality of servers performs the image processing for the received image data in a case where unexecuted image processing is specified by the information included in the received scan ticket, and the image processing is executable by said another server, and wherein said second processor of said user terminal receives the image data that has undergone the image processing by the plurality of servers via the network as a result of the instruction.

17. The system according to claim 13, wherein said user terminal operates as a client.

18. The system according to claim 13, wherein said user terminal includes a personal computer, a smartphone, and a tablet terminal.

19. The system according to claim 13, wherein the first processor edits the contents of the scan ticket so as to represent which has been executed and which is unexecuted out of the image processing.

20. The system according to claim 19, wherein the first processor describes, in the scan ticket, information representing which has been executed by the first processor in a case where said first processor edits the contents of the scan ticket.

21. A non-transitory computer readable storage medium which stores a computer program to be executed in at least one processor of an image reading apparatus for reading an image of an original, the program comprising:

reading the image of the original according to a scan ticket having a predetermined format and specifying image processing designated by a user;

performing image processing for image data obtained by reading the image of the original in the reading in a case where the image processing is specified in the scan ticket and is executable by the image reading apparatus;

editing contents of the scan ticket so as to include information for specifying image processing which is unexecuted out of the image processing specified in the scan ticket; and transmitting the edited scan ticket and image data that has undergone the image processing.

* * * * *